United States Patent [19]

Geberth

[11] Patent Number: 5,074,467
[45] Date of Patent: Dec. 24, 1991

[54] HIGH VOLUME LOW PRESSURE SPRAY PAINTING SYSTEM, METHOD OF OPERATION AND CONTROL SYSTEM THEREFOR

[76] Inventor: John D. Geberth, 10 Goose Cove La., Ramsey, N.J. 07446

[21] Appl. No.: 620,282

[22] Filed: Nov. 30, 1990

[51] Int. Cl.$^5$ .......................................... H01H 35/38
[52] U.S. Cl. ........................................ 239/8; 239/570; 239/373; 239/526; 417/368; 200/826; 200/81.9 R
[58] Field of Search ........ 200/81.9 R, 82 C, 410–417; 417/368, 366, 371; 239/570, 8, 373, 525, 526

[56] References Cited

U.S. PATENT DOCUMENTS

| | | | |
|---|---|---|---|
| 2,916,576 | 12/1959 | Croskey et al. | 200/82 C X |
| 4,244,527 | 1/1981 | De Fusco | 200/81.9 R X |
| 4,480,967 | 11/1984 | Schulze | 417/371 |
| 4,755,638 | 7/1988 | Gobarth | 200/82 C X |
| 4,762,472 | 8/1988 | King | 417/366 |
| 4,767,285 | 8/1988 | Jyoralcu et al. | 417/366 |
| 4,857,705 | 8/1989 | Bleviins | 200/81.9 R X |

Primary Examiner—Andres Kashnikow
Assistant Examiner—Kevin P. Weldon
Attorney, Agent, or Firm—Joseph J. Orlando

[57] ABSTRACT

There is provided a high volume low pressure spray painting system, control therefor, and method of operation therefor. The high volume low pressure spray painting system includes an electrically powered blower motor with a cooling fan, an high volume low pressure blower fan driven by the blower motor, an air conduit connecting the outlet of the blower fan to a spray gun adapted to atomize liquid paint with the high volume low pressure air delivered by the blower fan, and a valve in the spray gun actuated by a trigger for controlling the high volume low pressure air delivered by the blower fan. The control for the spray painting system includes a second valve arranged downstream from the blower fan outlet biased to a normally closed position which checks the flow of high volume low pressure air delivered by the blower fan when the valve in the spray gun is closed and simultaneously with the closing of the second valve the speed of the blower motor is reduced to idle. When the valve in the spray gun is open the pressure downstream from the second valve is reduced allowing the second valve to open and causing the speed of the blower motor to increase to a normal operating speed.

28 Claims, 5 Drawing Sheets

HIGH VOLUME LOW PRESSURE SPRAY PAINTING SYSTEM, METHOD OF OPERATION AND CONTROL SYSTEM THEREFOR

The present invention relates generally to paint spraying systems and, more particularly, it relates to a high volume low pressure paint spraying system wherein the high volume low pressure air is checked during temporary interruptions in the paint spraying operation.

At the present time, in high quality paint finish requirements such as automobile paint finishes, air under relatively high pressure is utilized to atomize paint issuing from a spray gun and because of the momentum thereby imposed on the particles of paint the atomized paint is transported to and deposited on the surface to be painted. In order for the paint to be suitably atomized in such systems, it is necessary for the paint to be suitably thinned with volatile thinners. The pressure of the air required for suitable atomization and deposition of the thinned paint in such systems is in the range of 40 to 60 pounds per square inch (p.s.i.). The transfer efficiency of such systems, i.e. the percentage of atomized paint and volatile thinners actually deposited on the surface being painted, is about 30%, so that relatively large amounts of volatile chemicals and paint are released to the atmosphere thereby causing environmental problems.

In recent years, with the world's attention being directed to the environment, certain government environmental protection agencies have focused on the environmental problem posed by the uncontrolled release into the atmosphere of volatile chemicals resulting from the paint spraying of automobiles and the like. The State of California has for instance imposed strict regulations on such paint spraying for the purpose of curtailing the uncontrolled release of such volatile chemicals into the atmosphere. These regulations require a transfer efficiency of at least 65% and in air spraying systems the use of air pressure less than 10 p.s.i. With the conventional high pressure air paint spraying systems, the 10 p.s.i. air pressure requirement is insufficient to adequately atomize and deposit the paint on the surface to be painted. As a result, a different approach has been taken with respect to the air spray system which is called the high volume low pressure spray painting system. This system utilizes a turbine to supply a high volume of low pressure air to a spray gun. This system satisfies both the environmental regulations imposed by environmental protection agencies, as in California, as well as the quality of finish required for such finishes as automobiles.

At the present time, the high volume low pressure system utilizing a turbine to supply the high volume of low pressure air for such painting purposes supplies a constant volume of air to the spray gun whether the spray gun is triggered for painting or not. There are several reasons for this, the first being the necessity of maintaining a volume of air flowing through the turbine drive motor to cool the motor and second, if the air is shut off or blocked the air is heated excessively resulting in possible damage to the equipment. A problem resulting from this system of constantly blowing air at the paint spray gun is dust particles and other debris being blown onto the freshly painted finish thereby detracting from the quality thereof. Another problem which results is an increase in the temperature of the spray gun as the air passes therethrough even when actual painting has ceased.

To alleviate the problems associated with the constant supply of air to the paint spray gun even when the gun is not triggered for painting, it has been proposed to bleed the air from the system when the painting operation has been interrupted. Thus, when the spray gun trigger is released, the air supplied to the gun is bypassed, dumped or bled between the gun and the turbine. Although this solution permits the turbine motor to be cooled by the continued passage of air therethrough and prevents an increase in spray gun temperature, it still results in a high volume of air being released in the environment near to the painted finish and is therefore an unsatisfactory answer to the problem.

Of course it is not feasible to shut off or terminate the operation of the turbine when it is desired to temporarily interrupt the painting operation since start up of the system thereafter would require excessive time and would be uneconomical.

It is, therefor, an object of the present invention to provide a high volume low pressure spray painting system and a method of operation therefor wherein the high volume low pressure air supplied to the spray gun by the turbine thereof is checked during interruption of the painting operation without completely stopping the turbine fan and while still maintaining a flow of cooling air through the turbine motor.

The above object, as well as others which will hereinafter become apparent, is accomplished in accordance with the present invention by providing a high volume low pressure paint spraying system wherein an electric motor driven turbine provides a supply of high volume low pressure air to a paint spray gun which atomizes the liquid paint issued by the spray gun for deposition on a work being painted and wherein upon temporary interruption of the painting operation the flow of air to the spray gun is checked and the turbine speed slowed to an idle sufficient to permit an adequate volume of air to cool the motor driving the turbine. A poppet valve is arranged in the air conduit between the turbine and the spray gun which is normally biased in the closed position, which bias is overcome by the air pressure supplied by the idling turbine when the pressure downstream from the valve is relieved by the triggering of the spray gun. A micro switch is activated by the valve such that when the valve is closed the switch activates a motor controller to slow the speed of the motor to idle and when the valve is open the switch activates the motor controller to increase the speed of the motor to drive the turbine at the speed necessary to supply the high volume low pressure air for spray painting operation. The spray gun trigger operates a valve in the spray gun so that when this valve is closed the pressure in the air conduit upstream from the spray gun is equalized with the air pressure upstream from the poppet valve which causes the in-line poppet valve to close because of the biasing action thereon and when the needle valve is initially opened the pressure in the air conduit upstream from the spray gun and downstream from the poppet valve is relieved so that the idle air pressure of the turbine overcomes the biasing action on the poppet valve to open the same.

The present invention will be described and understood more readily when considered together with the accompanying drawings, in which.

Figure 1:
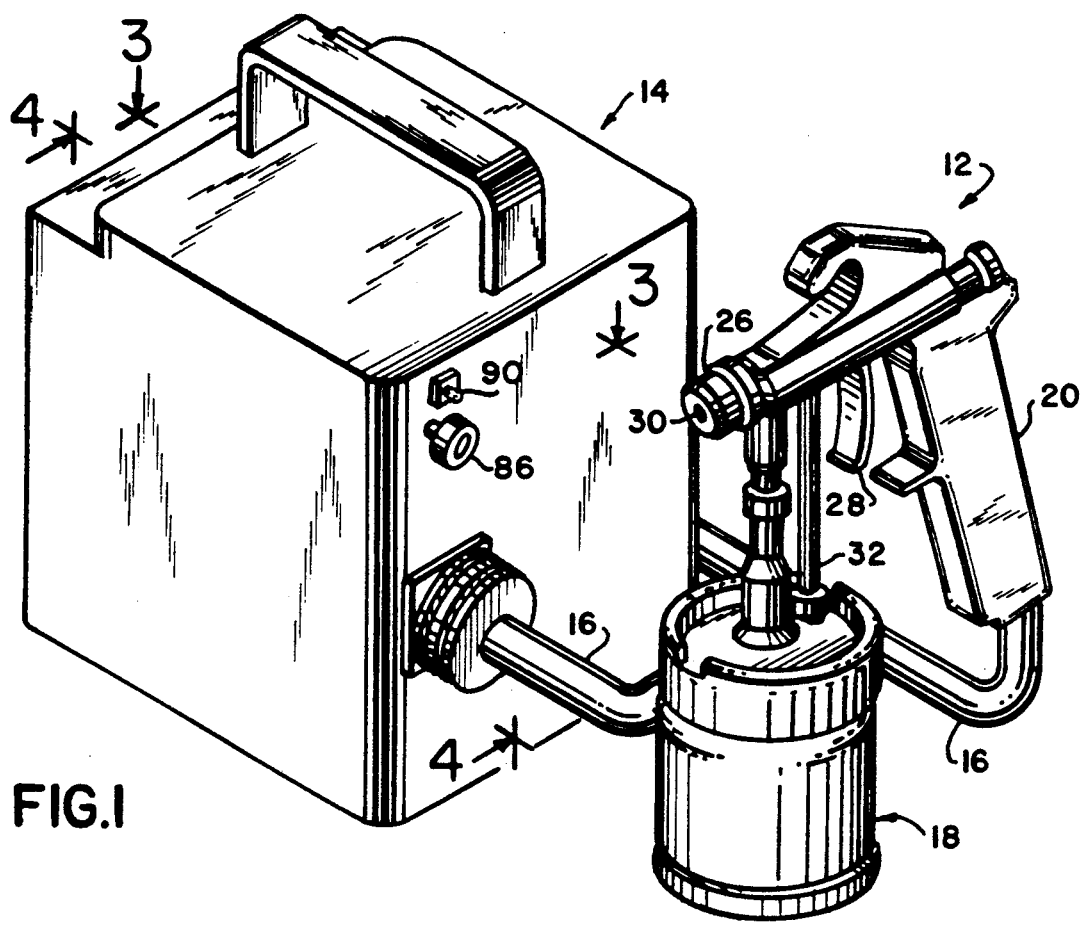
FIG. 1 is a perspective view of a high volume low pressure spray painting system according to the present invention.
Figure 6:
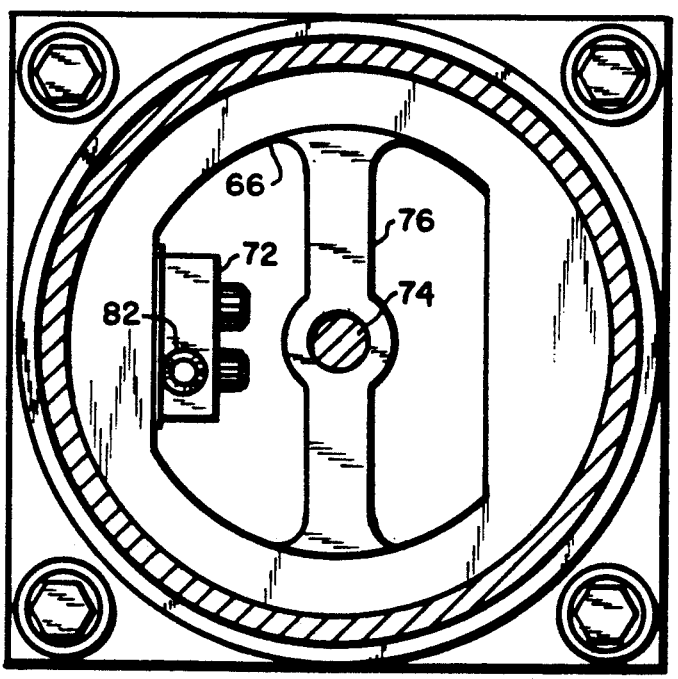
FIG. 6 is a cross-sectional view of the flow switch of the blower assembly taken along line 6—6 of FIG. 5.

Now turning to the drawings, there is shown in FIG. 1 a high volume low pressure spray painting system, generally designated 10, including a spray gun assembly, generally designated 12, and a blower assembly, generally designated 14. Spray gun assembly 12 is connected to blower assembly 14 by an air conduit, designated 16, through which the high volume low pressure air supplied by blower assembly 14 is conducted to spray gun assembly 12.

Figure 2:
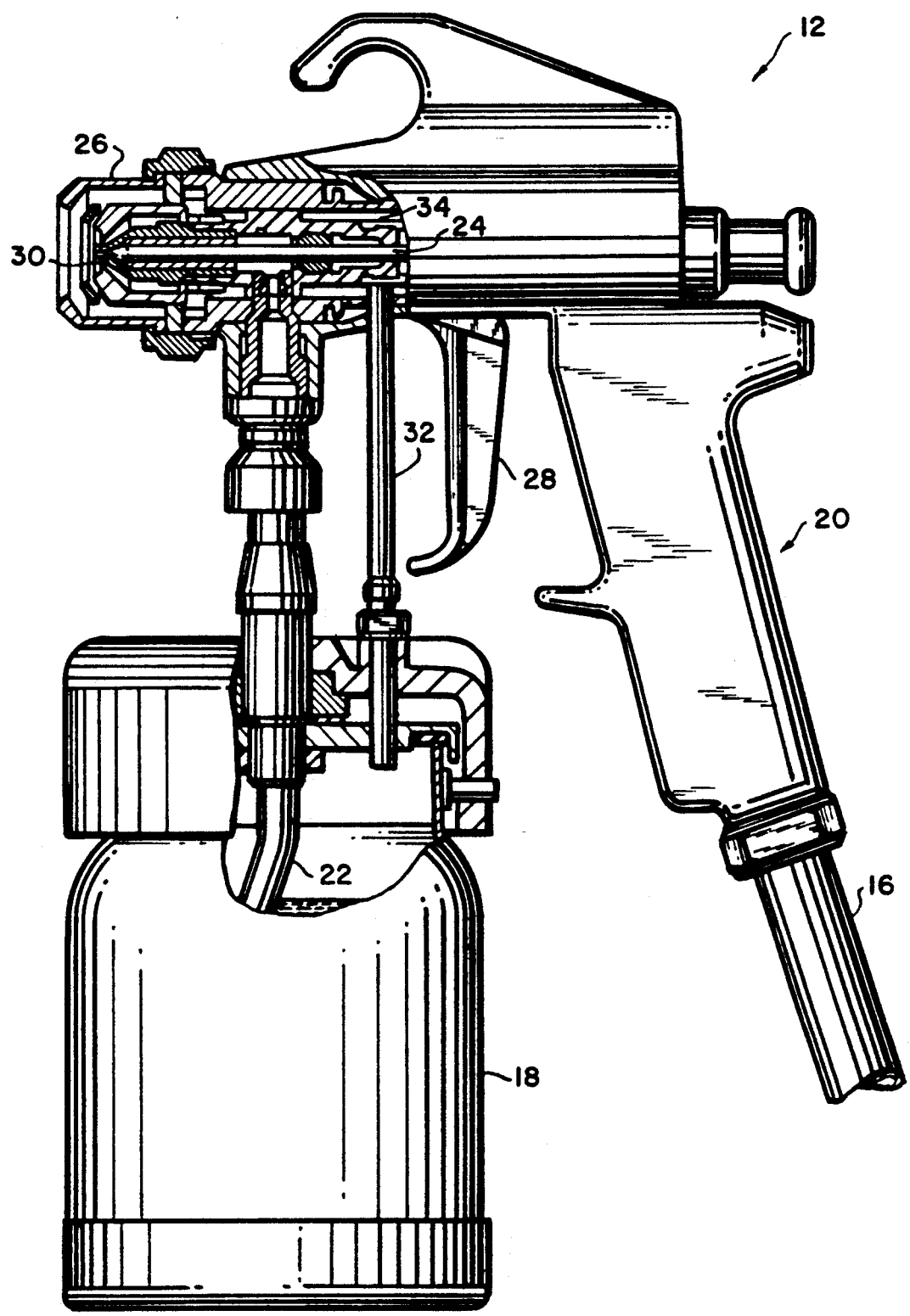
FIG. 2 is a cross-sectional view of the spray gun of the spray painting system shown in FIG. 1.

Spray gun assembly 12, as clearly seen in FIG. 2, includes a paint cup, designated 18, to the top of which is sealingly secured spray gun 20. Spray gun 20 includes a downwardly extending flow tube 22, a needle valve 24, a spray tip 26 and a trigger 28. When trigger 28 is moved rearwardly by the operator, needle valve 24 is moved rearwardly in spray gun 20 off its valve seat 30 thereby permitting communication between the atmosphere and air conduit 16. A pressure tube, designated 32, communicates between the air passageway 34 in spray gun 20 and paint cup 18 in order to pressurize the atmosphere in paint cup 18 above the liquid paint so as to urge the paint through flow tube 22 and into spray gun 20.

Figure 3:
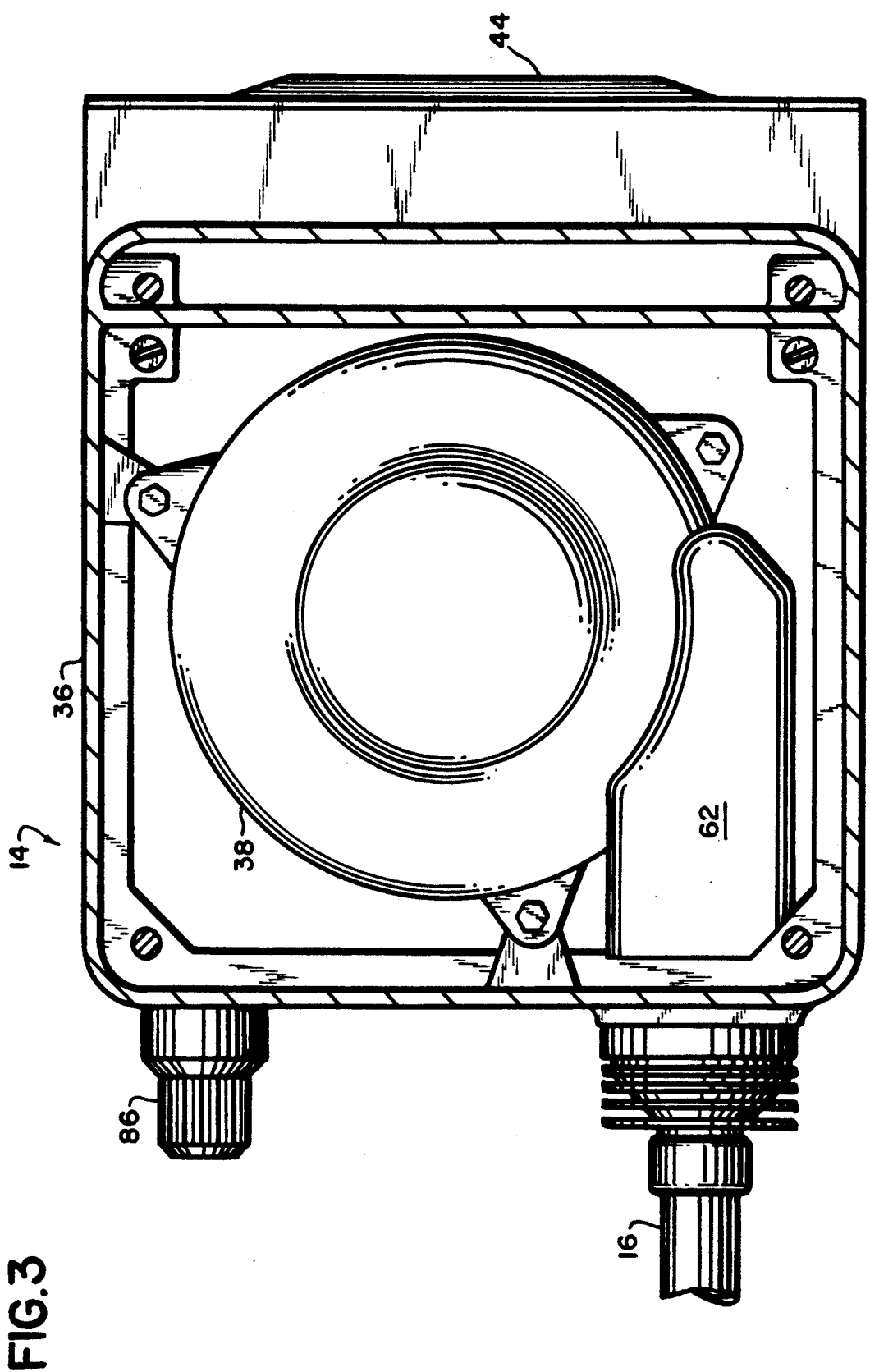
FIG. 3 is a cross-sectional view of the blower assembly of the spray painting system taken along line 3—3 of FIG. 1.
Figure 4:
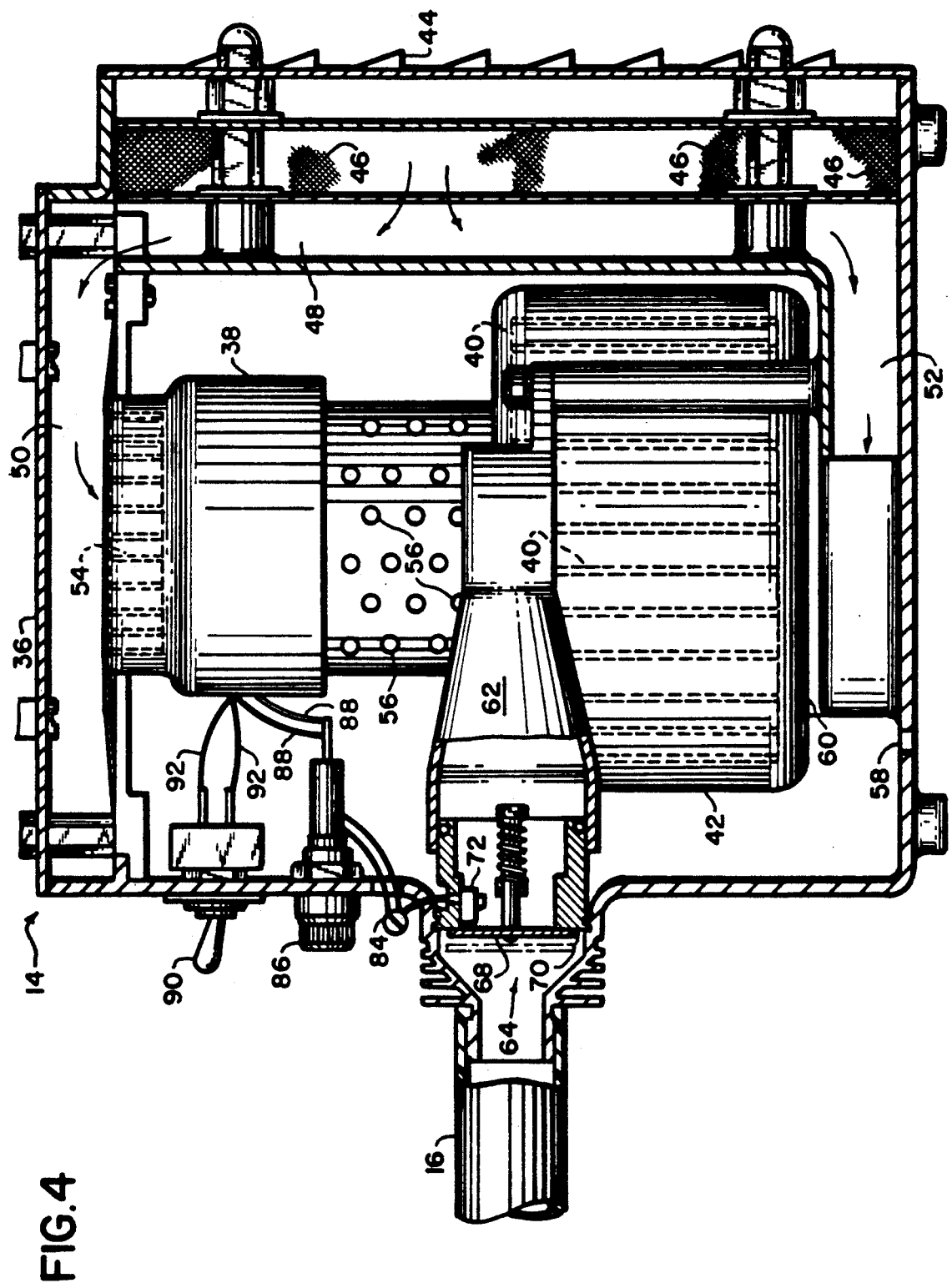
FIG. 4 is a cross-sectional view of the blower assembly of the spray painting system taken along line 4—4 of FIG. 1.

As clearly seen in FIGS. 3 and 4, blower assembly 14 includes a housing, designated 36, an electrically operated blower motor, designated 38, and a turbine fan 40 (shown in phantom in FIG. 4) housed in fan housing 42. Housing 36 includes a louvered opening 44 and air filter 46 through which the air to motor 38 and turbine fan 40 passes. The air passing through filter 46 enters fresh air plenum 48 and is divided between motor plenum 50 and fan plenum 52. The air in motor plenum 50 is drawn by motor fan 54 (shown in phantom in FIG. 4) into motor 38 to cool the same. This air is expelled from motor 38 through openings 56 in the cover thereof and out of housing 36 through openings 58 therein. The air in fan plenum 52 is drawn through fan intake 60 into fan housing 42 by fan 40 which pressurizes the air and expels it through fan outlet 62 and into air conduit 16 and ultimately to spray gun assembly 12.

Figure 5:
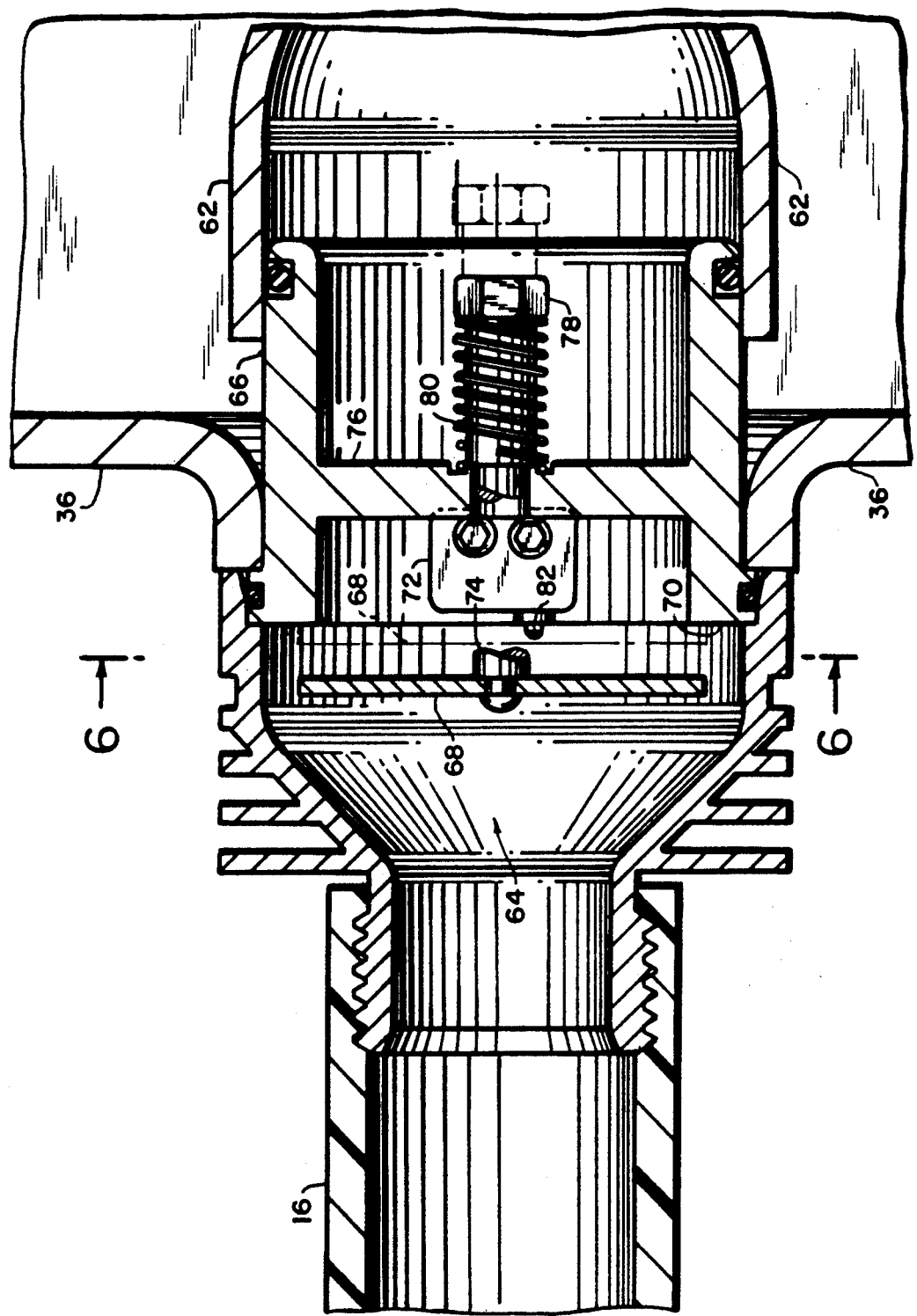
FIG. 5 is a cross-sectional view of the flow switch of the blower assembly taken along line 6—6 of FIG. 6.

A flow switch, generally designated 64, is arranged in blower assembly 14 at the exit of fan outlet 62 between fan outlet 62 and air conduit 16. Flow switch 64 includes a housing 66, a poppet valve 68 which closes on valve seat 70 at the exit of fan outlet 62 and a micro switch 72. As clearly seen in FIGURE 5, valve stem 74 of valve 68 passes through and is guided by fixed flange 76 of flow switch housing 66 and is provided with a spring retainer 78 at its end facing fan 40. A compression spring, designated 80, is arranged around stem 74 between retainer 78 and fixed flange 76. Micro switch 72 is fixedly arranged on flow switch housing 66 so that its activating button 82 is engaged by valve 68 when the valve is on its seat 70 in the closed position. This is clearly shown in FIG. 5 where valve 68 is shown in phantom in the closed position.

Micro switch 72 is electrically connected by means of wires 84 to motor controller 86 carried in blower housing 36, as clearly seen in FIG. 4. Motor controller 86 in turn is electrically connected by means of wires 88 to electric motor 38 of fan 40. An on-off switch, designated 90, is arranged on blower housing 36 and is also electrically connected by means of wires 92 to motor 38.

In operation, when it is desired to commence a painting operation with high volume low pressure spray painting system 10, the operator flips on-off switch 90 to the "ON" position thus energizing electric blower motor 38. Motor 38, when first energized, starts operation at idle speed since poppet valve 68 is resting on its seat 70 due to the biasing action of compression spring 80 which depresses push button 82 of micro switch 72. At the slower idle speed of motor 38, fan 40 does not produce sufficient air pressure to lift valve 68 off seat 70 until the operator has depressed trigger 38 of spray gun 20 thus moving needle valve 24 of its seat 30. This action has the effect of relieving the pressure downstream from poppet valve 68. When this occurs, the air pressure produced by the idling fan 40 at fan outlet 62 overcomes the biasing action of spring 80 lifting valve 68 off its seat thus disengaging valve 68 from activating button 82 of micro switch 72. Once button 82 has be released, micro switch 72 actuates motor controller 86 which causes the speed of motor 38 to increase to normal operating speed. At normal operating speed, fan 40 produces a high volume low pressure air supply to spray gun 20 to permit atomization of the liquid paint metered thereby sufficient for high quality painting operations. When the operator desires to temporarily interrupt the painting operation, he releases trigger 28 of spray gun 20 which closes needle valve 24 and equalizes the pressure upstream and downstream from poppet valve 68 causing it to close on its seat 70 and engage button 82 of micro switch 72. When button 82 is engaged by valve 68, micro switch 72 actuates motor controller 86 which causes the speed of motor 38 to be reduced to idle. At idle speed, sufficient air is drawn in by motor fan 54 to cool motor 38 to prevent overheating of the motor. In addition, the amount of air pressurized by fan 40 during idle is not sufficient to cause excessive heat build up in blower assembly 14.

It is to be understood that the foregoing general and detailed descriptions are explanatory of the present invention and are not to be interpreted as restrictive of the scope of the following claims.

What is claimed is:

1. In a high volume low pressure spray painting system having an electrically powered blower motor with a cooling fan, a high volume low pressure blower fan driven by said blower motor, an air conduit connecting the outlet of said blower fan to a spray gun adapted to atomize liquid paint with the high volume low pressure air delivered by said blower fan, and a valve in said spray gun actuated by a trigger for controlling the high volume low pressure air exiting from the spray gun, the improvement comprising:

means operating in cooperation with the valve in said spray gun to control the speed of said blower motor so that when said valve is closed checking the flow of high volume low pressure air exiting said spray gun the speed of said blower motor is adjusted to a slow idle speed sufficient to allow the cooling fan thereof to deliver sufficient air to cool said blower motor, and when said valve is open the speed of said blower motor is adjusted to a high speed sufficient for said blower fan to deliver high volume low pressure air to said spray gun to atomize the liquid paint metered by said spray gun.

2. The high volume low pressure spray painting system as defined in claim 1, wherein said means for controlling the speed of said blower motor includes second valve means downstream from said blower fan outlet and biasing means therefor to normally close said second valve means to check the flow of high volume low pressure air delivered by said blower fan when the valve in said spray gun is closed thereby equalizing the pressure upstream and downstream from said second valve means.

3. The high volume low pressure spray painting system as defined in claim 2, wherein said means for controlling the speed of said blower motor further includes switch means actuated by said second valve means which causes the speed of said blower motor to be adjusted in dependence on the open and closed positions of said second valve means.

4. The high volume low pressure spray painting system as defined in claim 2, wherein said second valve means includes a valve seat downstream from said blower fan outlet arranged in the flow of air delivered by said blower fan and a valve adapted to close on said valve seat to check the flow of air therethrough.

5. The high volume low pressure spray painting system as defined in claim 4, wherein said means for controlling the speed of said blower motor further includes a micro switch having an activating button, said micro switch being fixedly arranged so that said valve of said second valve means engages the activating button thereof when said valve is closed on said valve seat.

6. The high volume low pressure spray painting system as defined in claim 5, wherein said means for controlling the speed of said blower motor further includes a motor controller for controlling the speed of said blower motor, said motor controller being actuated by s id micro switch.

7. The high volume low pressure spray painting system as defined in claim 5, wherein the valve of said second valve means is a poppet valve.

8. A high volume low pressure spray painting system, comprising:
   (a) an electrically powered blower motor having a cooling fan for driving cooling air over said motor to cool the same;
   (b) a blower fan driven by said blower motor for delivering high volume low pressure air to a fan outlet;
   (c) a spray gun adapted to atomize liquid paint with high volume low pressure air;
   (d) first valve means arranged in said spray gun and actuated by a trigger means of said spray gun for controlling the high volume low pressure air exiting from said spray gun;
   (e) air conduit means connecting the fan outlet of said blower fan to said spray gun to thereby deliver the high volume low pressure air produced by said blower fan to said spray gun; and
   (f) means operating in cooperation with said first valve means to control the speed of said blower motor so that when said first valve means is closed checking the flow of high volume low pressure air exiting said spray gun the speed of said blower motor is adjusted to a slow idle speed sufficient to allow the cooling fan thereof to deliver sufficient air to cool said blower motor, and when said first valve means is open the speed of said blower motor is adjusted to a high speed sufficient for said blower fan to deliver high volume low pressure air to said spray gun to atomize the liquid paint metered by said spray gun.

9. The high volume low pressure spray painting system as defined in claim 8, wherein said means for controlling the speed of said blower motor includes second valve means downstream from said blower fan outlet and biasing means therefor to normally close said second valve means to check the flow of high volume low pressure air delivered by said blower fan when said first valve means in said spray gun is closed thereby equalizing the pressure upstream and downstream from said second valve means.

10. The high volume low pressure spray painting system as defined in claim 9, wherein said means for controlling the speed of the said blower motor further includes switch means actuated by said second valve means which causes the speed of said blower motor to be adjusted in dependence on the open and closed positions of said second valve means.

11. The high volume low pressure spray painting system as defined in claim 9, wherein said second valve means includes a valve seat downstream from said blower fan outlet arranged in the flow of air delivered by said blower fan and a valve adapted to close on said valve seat to check the flow of air therethrough.

12. The high volume low pressure spray painting system as defined in claim 11, wherein said means for controlling the speed of said blower motor further includes a micro switch having an activating button, said micro switch being fixedly arranged so that the valve of said second valve means engages the activating button thereof when the valve of said second valve means is closed on said valve seat.

13. The high volume low pressure spray painting system as defined in claim 12, wherein said means for controlling the speed of said blower motor further includes a motor controller for controlling the speed of said blower motor, said motor controller being actuated by said micro switch.

14. The high volume low pressure spray painting system as defined in claim 12, wherein the valve of said second valve means is a poppet valve.

15. A method of operation for a high volume low pressure spray painting system having an electrically powered blower motor with a cooling fan, a high volume low pressure blower fan with an outlet and driven by said blower motor, an air conduit connecting the outlet of said blower fan to a spray gun adapted to atomize liquid paint with the high volume low pressure air delivered by said blower fan, and a valve in said spray gun actuated by a trigger for controlling the high volume low pressure air exiting from the spray gun, comprising:
   controlling the speed of said blower motor so that when said valve in said spray gun is closed checking the flow of high volume low pressure air exiting said spray gun the speed of said blower motor is adjusted to a slow idle speed sufficient to allow the cooling fan thereof to deliver sufficient air to cool said blower motor, and when said valve is open the speed of said blower motor is adjusted to a high speed sufficient for said blower fan to deliver high volume low pressure air to said spray gun to atomize the liquid paint metered by said spray gun.

16. The method of operation of a high volume low pressure spray painting system as defined in claim 15, wherein the step of controlling the speed of said blower motor includes providing second valve means downstream from said blower fan outlet and biasing means therefor to normally close said second valve means to check the flow of high volume low pressure air delivered by said blower fan when the valve in said spray gun is closed thereby equalizing the pressure upstream and downstream from said second valve means.

17. The method of operation of a high volume low pressure spray painting system as defined in claim 16, wherein the step of controlling the speed of said blower motor includes providing switch means actuated by said second valve means which causes the speed of said blower motor to be adjusted in dependence on the open and closed positions of said second valve means.

18. The method of operation a high volume low pressure spray painting system as defined in claim 16, wherein said second valve means includes a valve seat downstream from said blower fan outlet arranged in the flow of air delivered by said blower fan and a valve adapted to close on said valve seat to check the flow of air therethrough.

19. The method of operation of a high volume low pressure spray painting system as defined in claim 18, wherein the step of controlling the speed of said blower motor includes providing a micro switch having an activating button and being fixedly arranged so that the valve of said second valve means engages the activating button thereof when said valve is closed on said valve seat.

20. The method of operation of a high volume low pressure spray painting system as defined in claim 19, wherein the step of controlling the speed of said blower motor includes providing a motor controller for controlling the speed of said blower motor, said motor controller being actuated by said micro switch 21. The method of operation of a high volume low pressure spray painting system as defined in claim 19, wherein the valve of said second valve means is a poppet valve.

22. A control system for a high volume low pressure spray painting system having an electrically powered blower motor with a cooling fan, a high volume low pressure blower fan with an outlet and driven by said blower motor, an air conduit connecting the outlet of said blower fan to a spray gun adapted to atomize liquid paint with the high volume low pressure air delivered by said blower fan, and a valve in said spray gun actuated by a trigger for controlling the high volume low pressure air exiting from the spray gun, said control system comprising:

means operating in cooperation with the valve in said spray gun to control the speed of said blower motor so that when said valve is closed checking the flow of high volume low pressure air exiting said spray gun the speed of said blower motor is adjusted to a slow idle speed sufficient to allow the cooling fan thereof to deliver sufficient air to cool said blower motor, and when said valve is open the speed of said blower motor is adjusted to a high speed sufficient for said blower fan to deliver high volume low pressure air to said spray gun to atomize the liquid paint metered by said spray gun.

23. The control system for a high volume low pressure spray painting system as defined in claim 22, wherein said means for controlling the speed of said blower motor includes second valve means downstream from said blower fan outlet and biasing means therefor to normally close said second valve means to check the flow of high volume low pressure air delivered by said blower fan when the valve in said spray gun is closed thereby equalizing the pressure upstream and downstream from said second valve means.

24. The control system for a high volume low pressure spray painting system as defined in claim 23, wherein said means for controlling the speed of said blower motor further includes switch means actuated by said second valve means which causes the speed of said blower motor to be adjusted in dependence on the open and closed positions of said second valve means.

25. The control system for a high volume low pressure spray painting system as defined in claim 23, wherein said second valve means includes a valve seat downstream from said blower fan outlet arranged in the flow of air delivered by said blower fan and a valve adapted to close on said valve seat to check the flow of air therethrough.

26. The control system for a high volume low pressure spray painting system as defined in claim 25, wherein said means for controlling the speed of said blower motor further includes a micro switch having an activating button, said micro switch being fixedly arranged so that the valve of said second valve means engages the activating button thereof when said valve is closed on said valve seat.

27. The control system for a high volume low pressure spray painting system as defined in claim 26, wherein said means for controlling the speed of said blower motor further includes a motor controller for controlling the speed of said blower motor, said motor controller being actuated by said micro switch.

28. The control system for a high volume low pressure spray painting system as defined in claim 26, wherein the valve of said second valve means is a poppet valve.

* * * * *